Patented Oct. 30, 1934

1,978,598

UNITED STATES PATENT OFFICE 1,978,598

SYNTHETIC RESIN AND METHOD OF PRODUCING

Ernest G. Peterson, Wilmington, Del., assignor to Hercules Powder Company, Wilmington, Del., a corporation of Delaware No Drawing. Application March 19, 1932, Serial No. 600,051. Renewed September 22, 1933

18 Claims. (Cl. 260—8)

This invention relates to a new composition of matter and method for its production.

In accordance with this invention a novel synthetic resin, having characteristics rendering it valuable for use variously in the commercial arts, is prepared by reacting together alphaterpinene, maleic anhydride and rosin or abietic acid. The reaction involved is probably explained on the basis of the unsaturated bond of the maleic anhydride reacting with the unsaturated bonds of the alpha-terpinene and the abietic acid. The new composition is a highly acidic material of complex nature.

In preparing the synthetic resin in accordance with my invention the reagents may be reacted in widely varying proportions depending upon the physical characteristics desired for the resin product with consideration to the use to which it is to be put. Generally speaking, it is desirable to employ maleic anhydride approximately in the proportion necessary to completely satisfy the reactivity of the alpha-terpinene and the abietic acid. Thus, for example, with use of relatively large amounts of alpha-terpinene, the product is soft and tough, with more abietic acid in proportion to terpinene, the product is hard and brittle and so on, it being clear that by varying the proportions and amounts of the reagents products having varying characteristics may be produced. As illustrative, for example, alpha-terpinene may be used within about the range 0.1 to 0.9 moles, maleic anhydride within about the range 0.2 to 2.0 moles and abietic acid within about the range 0.1 to 0.9 moles.

Alpha-terpinene may be readily derived from terpenes or terpene derivatives as, for example, pinene, dipentene, alphaterpineol, terpin hydrate, etc. by treatment with sulphuric acid, which effects rearrangement of the terpene to a mixture of substances the major constituent of which is alpha-terpinene. Thus, for example, 70 cc. of sulphuric acid are added gradually to 2 liters of pinene with agitation. The mixture is allowed to cool, then neutralized with an alkali, as sodium hydroxide, and steam-distilled. The distillate is then fractionated and the fraction boiling within about the range 172-180° C. collected as the terpinene fraction. If desired alpha-terpinene may be obtained by the fractionation of crude turpentine oil using the fraction boiling within about the range 178-182° C. In any event the alpha-terpinene will be associated with impurities as dipentene, para-cymene, etc.

In preparing the improved synthetic resin the reagents will be reacted in the presence of heat. However, it will be expressly understood that any means for effecting the reaction is contemplated as within the scope of this invention. Any suitable temperature may be used, though a temperature within the range say about 125-250° C. is desirable. The reaction will usually be carried out under atmospheric pressure, but with variations of temperature procedure under reduced or super pressure will obviously be within the scope of my invention. The production of the resin in accordance with this invention may be carried out in any suitable apparatus, as any suitable container in which the reagents may be heated. On completion of the reaction any volatile unreacted matter may be removed or separated from the product by the application of a vacuum to the reaction mass before cooling.

As a specific illustration, for example, 85 parts by weight of alpha-terpinene, 165 parts of abietic acid and 98 parts of maleic anhydride are heated together at a temperature of approximately 200° C. for about 3 hours. The pressure on the reaction mass is then reduced to about 15 mm. of mercury and any unreacted maleic anhydride and the inert ingredients associated with the alpha-terpinene are distilled off.

The reaction product obtained by the above procedure will be found to have a direct acid number of about 250, saponification value of about 400, melting point (drop method) of about 100° C. and a rhodanometric iodine value of 10.

As illustrative of various amounts of the several reagents which may be reacted to produce resins in accordance with this invention, for example, the reagents may be reacted in the various proportions given in the following table:

| Alpha-terpinene | Rosin | Maleic anhydride |
|---|---|---|
| Parts by weight | Parts by weight | Parts by weight |
| 160 | 20 | 98 |
| 150 | 42 | 98 |
| 130 | 83 | 98 |
| 43 | 250 | 98 |

The several reagents in, for example, the proportion given in the above table may be reacted in any suitable container, at a temperature say within the range 150° C.–250° C. for say one to five hours. Volatile unreacted matter may, as has been indicated, be removed on completion of the reaction by reducing the pressure in the reaction mass before cooling.

The product in accordance with this invention will be found to be a highly acidic resin, capable, for example, of reacting with alcohols, as for example, polyhydric alcohols, to yield synthetic gums or resins which have characteristics making them highly desirable for use, for example, in varnishes, lacquers, etc., etc.

As an example of the esterification of the product obtained in the specific illustration above with a polyhydric alcohol the following is illustrative: About 100 parts by weight of the above reaction product and 58 parts of glycerol are heated at a temperature of 230-240° C. for 6 hours. The resulting resin has an acid value of 40 and a melting point (drop method) of approximately 100° C. It is highly desirable for use in lacquers and varnishes. Drying or semi-drying oils or their acids may be added.

Esterification with monohydric alcohols may likewise be carried out, in the case of low-boiling alcohols preferably under pressure.

It will be understood that in producing the compositions comprising this invention abietic acid as such may be used or rosin, either wood or gum, preferably high in abietic acid content may be used equivalently.

It is also contemplated to use esters of abietic acid in place of the acid itself. When an ester of abietic acid is employed the acidity of the reaction product is lower due to the fact that one carboxyl group is esterified. Suitable esters are those from any monohydric or polyhydric alcohol such as the methyl, ethyl, propyl, glycol or glyceryl.

As a specific illustration, for example, of the use of an ester of abietic acid, 85 parts by weight of alpha-terpinene, 158 parts of methyl abietate and 98 parts of maleic anhydride are heated together at a temperature of about 200° C. for three hours. The pressure is then reduced to 15 mm. of mercury and the excess of maleic anhydride and the inert ingredients associated with the alpha-terpinene are removed.

It will also be understood that maleic acid is contemplated as an operable equivalent of maleic anhydride in the reaction within the scope of this invention.

It will be understood that the term abietic acid as used in the claims appended hereto is contemplated as including the several equivalents specified herein, as abietic acid ester, rosin, etc. and operable equivalents therefor and that the term maleic anhydride is contemplated as including maleic acid as an equivalent.

What I claim and desire to protect by Letters Patent is:

1. A synthetic resin comprising the reaction product of alpha-terpinene, maleic anhydride and abietic acid.

2. A synthetic resin comprising the reaction product of alpha-terpinene, maleic anhydride and rosin.

3. A synthetic resin comprising the reaction product of alpha-terpinene, about 15-150 parts by weight, maleic anhydride about 20-200 parts by weight and rosin about 30-300 parts by weight.

4. The method of producing a synthetic resin which includes reacting alpha-terpinene, maleic anhydride and abietic acid.

5. The method of producing a synthetic resin which includes reacting alpha-terpinene, maleic anhydride and rosin.

6. The method of producing a synthetic resin which includes reacting alpha-terpinene, maleic anhydride and abietic acid under the influence of heat.

7. The method of producing a synthetic resin which includes reacting alpha-terpinene, maleic anhydride and rosin under the influence of heat.

8. The method of producing a synthetic resin which includes reacting alpha-terpinene, maleic anhydride and abietic acid under the influence of heat at a temperature of about 125-250° C.

9. The method of producing a synthetic resin which includes reacting alpha-terpinene, maleic anhydride and abietic acid under the influence of heat and reducing the pressure on the reaction mass to effect volatilization of unreacted matter.

10. A synthetic resin comprising the reaction product of alpha-terpinene, maleic anhydride and an abietic acid ester of a character such that the abietyl radical is available for reaction.

11. The method of producing a synthetic resin which includes reacting alpha-terpinene, maleic anhydride and an abietic acid ester of a character such that the abietyl radical is available for reaction.

12. A synthetic resin comprising the reaction product of alpha-terpinene, maleic anhydride and a compound containing the abietyl radical.

13. The method of producing a synthetic resin which includes reacting alpha-terpinene, maleic anhydride and a compound containing the abietyl radical and of a character such that the abietyl radical is available for reaction.

14. The method of producing a synthetic resin which includes reacting alpha-terpinene, maleic anhydride and a compound containing the abietyl radical and of a character such that the abietyl radical is available for reaction under the influence of heat.

15. A synthetic resin comprising the reaction product of alpha-terpinene, maleic anhydride and a rosin ester.

16. The method of producing a synthetic resin which includes reacting alpha-terpinene, maleic anhydride and a rosin ester of a character such that the abietyl radical is available for reaction in the presence of heat.

17. The method of producing a synthetic resin which includes heating together alpha-terpinene, maleic anhydride and an abietic acid ester of a character such that the abietyl radical is available for reaction at a temperature of from about 125° to about 250° C.

18. The method of producing a synthetic resin which includes heating together alpha-terpinene, maleic anhydride and a compound containing an abietyl radical and of a character such that the abietyl radical is available for reaction at a temperature of about 125° to about 250° C.

ERNEST G. PETERSON.